(12) United States Patent
Thoma et al.

(10) Patent No.: US 8,662,804 B2
(45) Date of Patent: Mar. 4, 2014

(54) MULTI-LAYER HOLD DOWN ASSEMBLY

(75) Inventors: Michael Thoma, Lafayette, IN (US);
Danny L. Gilbert, Monticello, IN (US);
Francis Smidler, Lafayette, IN (US)

(73) Assignee: Wabash National, L.P., Lafayette, IN (US)

( * ) Notice: Subject to any disclaimer, the term of this patent is extended or adjusted under 35 U.S.C. 154(b) by 21 days.

(21) Appl. No.: 13/297,986

(22) Filed: Nov. 16, 2011

(65) Prior Publication Data

US 2012/0061533 A1    Mar. 15, 2012

Related U.S. Application Data

(62) Division of application No. 12/259,440, filed on Oct. 28, 2008, now Pat. No. 8,079,793.

(60) Provisional application No. 61/000,823, filed on Oct. 29, 2007.

(51) Int. Cl.
*B60P 7/08*    (2006.01)

(52) U.S. Cl.
USPC .............. 410/112; 410/97; 410/106; 410/111

(58) Field of Classification Search
USPC ........... 410/97, 102, 106, 107, 108, 109, 110, 410/111, 112, 113, 114; 24/115 K, 265 CD; 248/499
See application file for complete search history.

(56) References Cited

U.S. PATENT DOCUMENTS

| | | |
|---|---|---|
| 2,939,406 A | 6/1960 | Wilkoff |
| D194,437 S | 1/1963 | Salter |
| 3,377,039 A | 4/1968 | Hayes |
| 3,771,270 A | 11/1973 | Byers |
| 3,786,955 A | 1/1974 | Mowatt-Larssen |
| 3,807,748 A | 4/1974 | Ramillon |
| 3,841,445 A | 10/1974 | Rinker |
| D258,044 S | 1/1981 | Kimball |
| D286,147 S | 10/1986 | Carlson |
| D301,433 S | 6/1989 | Krauss |
| 4,987,654 A | 1/1991 | Mejias |
| D364,084 S | 11/1995 | Yaich |
| D378,987 S | 4/1997 | Ross |
| D386,387 S | 11/1997 | Rausch |
| D390,776 S | 2/1998 | Ueno |
| 5,752,791 A | 5/1998 | Ehrlich |
| 5,992,117 A | 11/1999 | Schmidt |
| D436,518 S | 1/2001 | Matsubara |
| D442,064 S | 5/2001 | Chung |
| D442,398 S | 5/2001 | Waisbrod |
| D443,811 S | 6/2001 | Tisbo |
| D456,692 S | 5/2002 | Epstein |
| D465,722 S | 11/2002 | Shijyo |

(Continued)

OTHER PUBLICATIONS

PCT International Search Report on International Application No. PCT/US2008/081429 and Written Opinion dated Dec. 9, 2009, 6 pages.

(Continued)

*Primary Examiner* — Stephen Gordon

(57) ABSTRACT

A low profile hold down assembly is mounted to the exterior surface of a sidewall of a trailer. The hold down assembly includes a cover member formed from the same material from which the sidewall of the trailer is formed and therefore is aesthetically desirable.

12 Claims, 7 Drawing Sheets

(56) References Cited

U.S. PATENT DOCUMENTS

| | | |
|---|---|---|
| D465,988 S | 11/2002 | Green |
| D478,496 S | 8/2003 | Gratiot |
| D479,978 S | 9/2003 | Watabe et al. |
| 6,626,623 B2 | 9/2003 | DeLay |
| D483,245 S | 12/2003 | Harris et al. |
| 6,708,637 B1 | 3/2004 | Webster |
| 6,764,259 B1 | 7/2004 | Preta |
| 6,854,944 B2 | 2/2005 | Hoffmann et al. |
| 6,860,303 B2 | 3/2005 | Rensel et al. |
| D520,343 S | 5/2006 | Powell |
| D527,620 S | 9/2006 | Aoki |
| D531,013 S | 10/2006 | Yuta et al. |
| D539,117 S | 3/2007 | Sealey et al. |
| 7,201,533 B2 | 4/2007 | DeGreef |
| D551,943 S | 10/2007 | Hodjat et al. |
| D555,469 S | 11/2007 | Unger |
| D559,660 S | 1/2008 | DeCosta |
| D560,114 S | 1/2008 | Mockett |
| D573,874 S | 7/2008 | Thoma |
| 7,686,551 B2 * | 3/2010 | Grasso .......................... 410/107 |
| 8,079,793 B2 | 12/2011 | Thoma et al. |
| 2007/0170193 A1 | 7/2007 | Schorner |
| 2008/0009148 A1 | 1/2008 | Goodman |

OTHER PUBLICATIONS

Office Action for P.R. China Patent Application 2000880114680.2, date of issue Aug. 18, 2011, 13 pages.

Office Application got U.S. Appl. No. 12/259,440 dated May 10, 2011, 17 pages.

Second Office Action for P.R. China Application 200880114680.2, date of issue Jun. 18, 2012, 12 pages.

Jul. 22, 2013 letter from foreign counsel Goodrich Riquelme Asociados advising of a First Mexican Office Action for Mexican Patent Application MX/a/2012/014823, 2 pages.

* cited by examiner

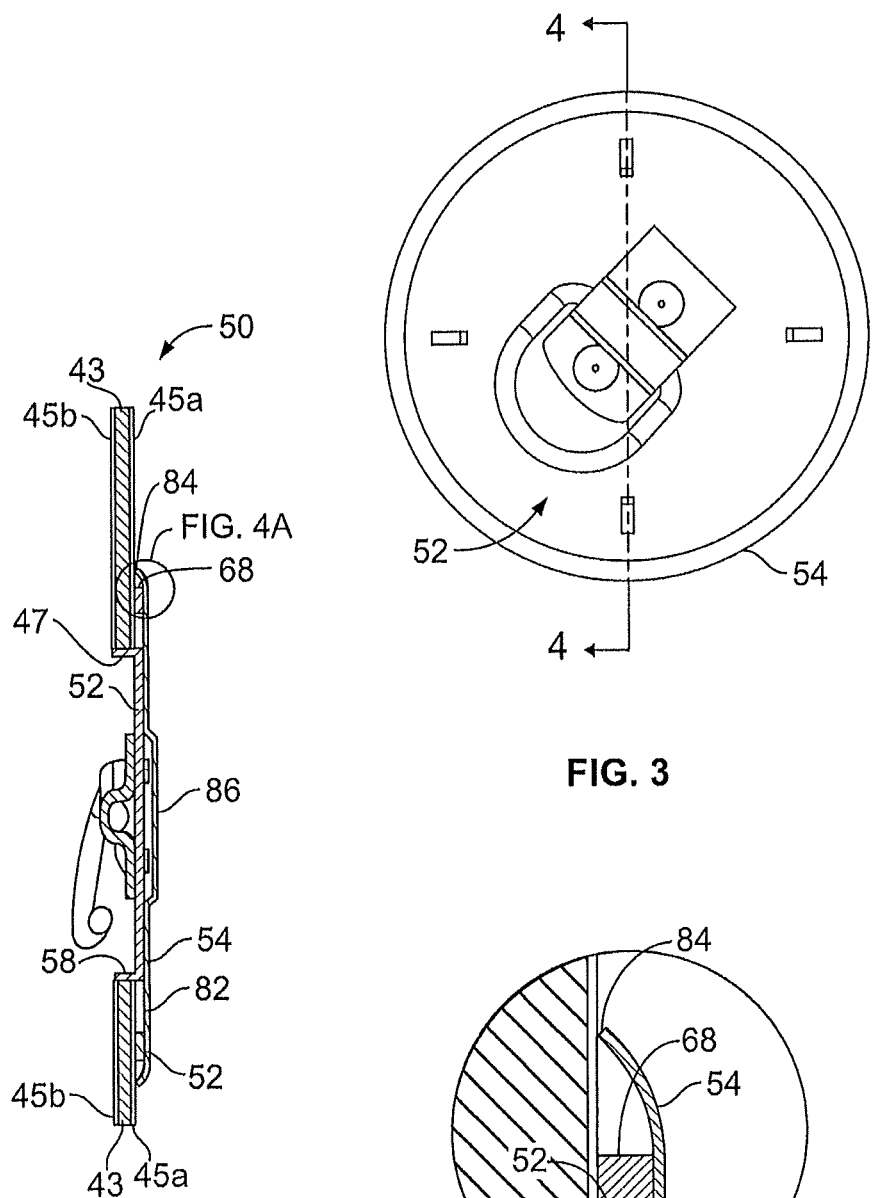

MULTI-LAYER HOLD DOWN ASSEMBLY

This application is a divisional of U.S. Pat. No. 8,079,793 filed on Oct. 28, 2008, which claims the domestic benefit of U.S. Provisional Application Ser. No. 61/000,823 filed on Oct. 29, 2007, the entirety of the disclosures of each of which are hereby incorporated by reference herein.

FIELD OF THE INVENTION

This invention is generally directed to a low profile hold down assembly mounted to the sidewall of a trailer for use in securing cargo within the trailer.

BACKGROUND OF THE INVENTION

Trailers, such as semi-trailers, have cargo restraint systems in which various restraining bars or flexible straps have end clips which are coupled a cargo securement assembly provided on the sidewall of the trailer. U.S. Pat. No. 5,752,791 discloses such a cargo securement assembly for stabilizing freight cargo upon a transport vehicle or the like. The cargo securement assembly includes a support panel secured to the sidewall of the trailer and an aperture formed through the sidewall. A coupling clip, which can form the end of any cargo strap, is releasably insertable through the aperture and has an articulated locking structure releasably engageable against one of the wall which forms the aperture.

While this cargo securement assembly has worked well, it is limited because a specific coupling clip is required in order to make the cargo securement assembly function. In addition, because of the size of the coupling clip, the cargo securement assembly is not low profile.

SUMMARY OF THE INVENTION

A low profile hold down assembly is mounted to the exterior surface of a sidewall of a trailer. The hold down assembly includes a cover member formed from the same material from which the sidewall of the trailer is formed and therefore is aesthetically desirable.

BRIEF DESCRIPTION OF THE DRAWINGS

The organization and manner of the structure and operation of the invention, together with the objects and advantages thereof may best be understood by reference to the following description, taken in connection with the accompanying drawings, wherein like reference numerals identify like elements in which:

FIG. 3 is a rear elevational view of the hold down assembly;

FIG. 4 is a cross sectional view along line 4-4 of the hold down assembly of FIG. 3, and also shows a portion of the sidewall of the trailer;

FIG. 4A is an enlarged view of a portion of the hold down assembly shown in FIG. 4, with the portion of the sidewall of the trailer removed;

DETAILED DESCRIPTION OF THE PREFERRED EMBODIMENT

Figure 1:
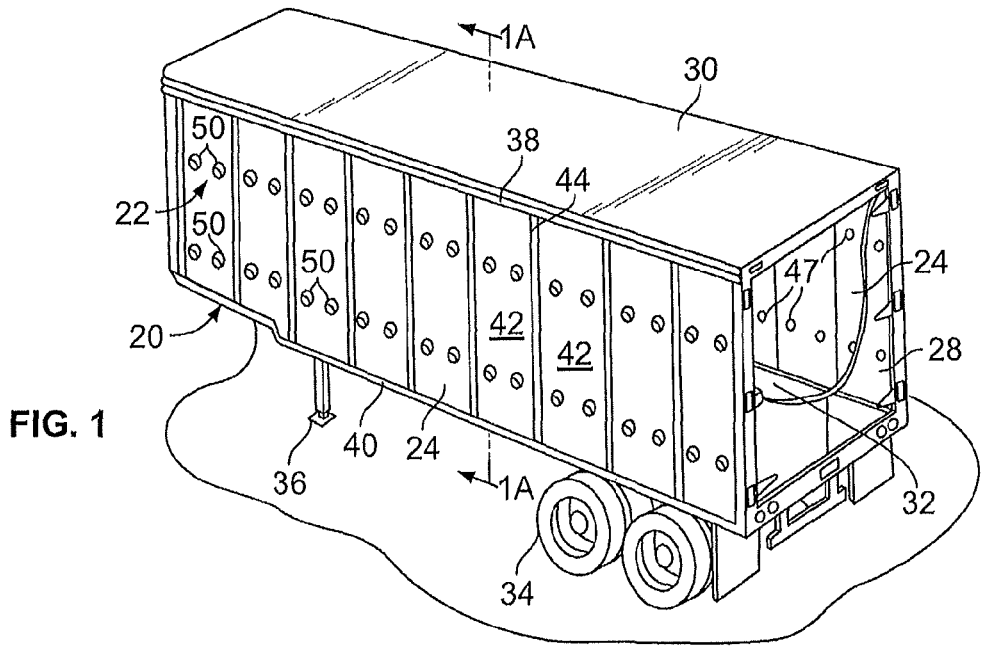
FIG. 1 is a perspective view of a trailer having a plurality of the hold down assemblies which incorporate the features of the present invention; the hold down assemblies are mounted on the sidewalls of the trailer.
Figure 1A:
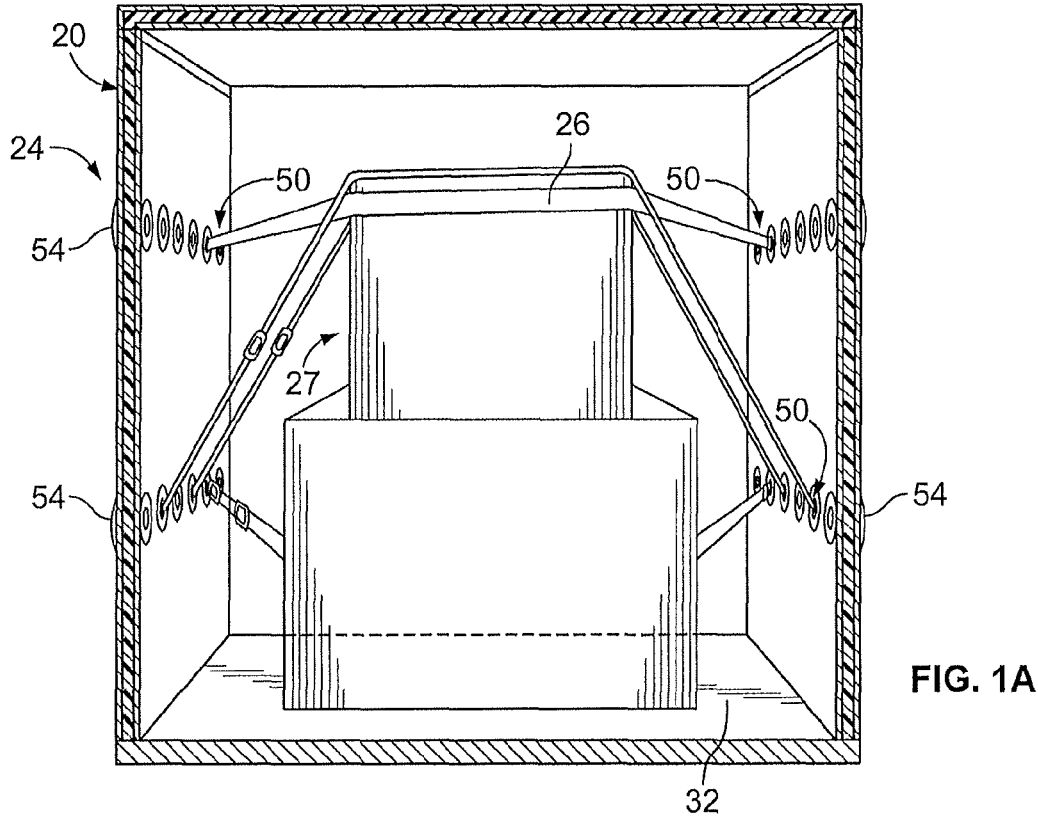
FIG. 1A is an end view of the cargo compartment shown in FIG. 1 in which cargo is stabilized by belts whose ends are anchored by the hold down assemblies.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

A hold down assembly 50 is provided for use in connection with the sidewalls 24 of a trailer 20. The hold down assembly 50 is used to secure cargo 27 within the trailer 20.

The trailer 20 connects to a tractor (not shown) by conventional means, such as a fifth wheel assembly. The trailer 20 includes a body 22 formed from a pair of rectangular sidewalls 24, a front wall (not shown), rear doors 28, a top panel or roof 30, and a floor 32. The floor 32 is supported by a conventional rear undercarriage assembly 34 and a landing gear 36. The roof 30 and an upper portion of the sidewalls 24 are secured to a top rail 38, and the floor 32 and a lower portion of the sidewalls 24 are secured to a bottom rail 40.

As shown in the drawings, each sidewall 24 includes a plurality of vertical upstanding composite side panels 42 joined together by a joint configuration 44. Each composite panel 42 includes a core member 43 sandwiched between an outer thin skin 45a and an inner thin skin 45b and bonded thereto by a suitable known adhesive or other like means. The outer skin 45a and the inner skin 45b may be formed of metal, preferably aluminum or steel, and can range in thickness (such as 0.013 inches to 0.026 inches for steel skins and 0.050 inches for aluminum skins) or may be a thin composite material and can range in thickness (such as 0.026 inches). It is to be understood that other thicknesses may be used as required by the application. Typically, each composite panel 42 is four feet in width, but can be longer or shorter depending on the application. At least two panels 42 are joined together to form the sidewall 24 of the body 22. The core member 43 is made of some type of compressible non-metal material, preferably thermoplastic, such as polypropylene or high density polyethylene. Alternatively, the sidewall 24 can be formed of a continuous sheet of composite material, or the sidewall 24 can be formed of aluminum or fiberglass plates and posts, or any other known sidewall structure.

Figure 2:
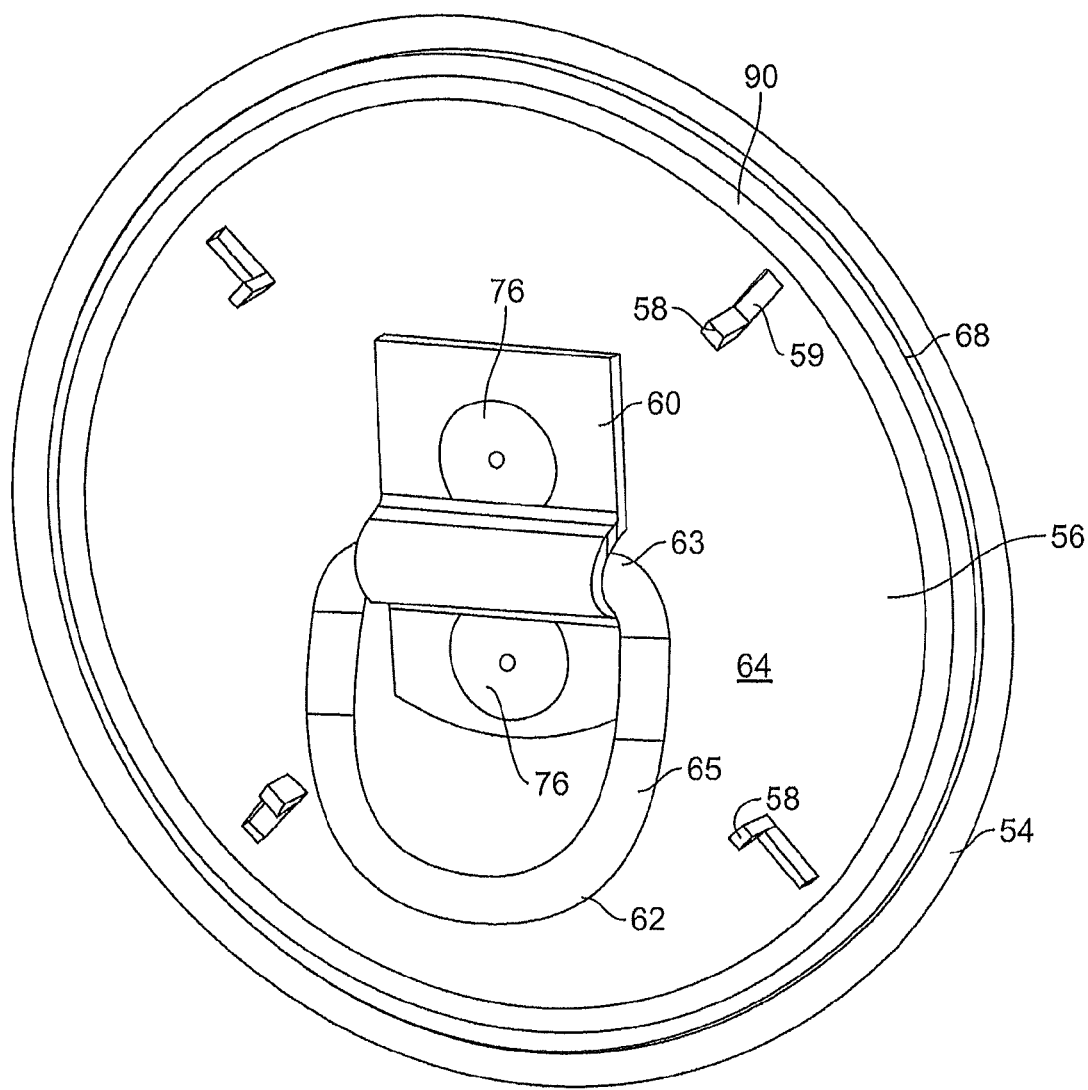
FIG. 2 is a perspective view of one of the hold down assemblies before installing into the trailer.

A plurality of apertures 47 are provided through the sidewalls 24 at predetermined positions, and as shown in FIGS. 1 and 4, a hold down assembly 50 is mounted at each aperture 47. As shown in FIGS. 2-4, the hold down assembly 50 includes a plate assembly 52 and a cover 54.

Figure 6:
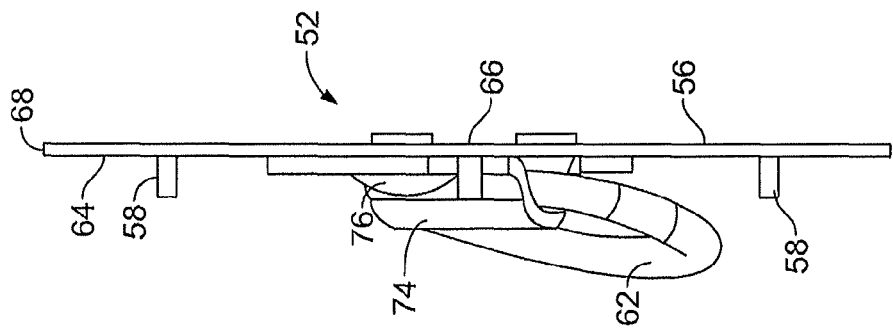
FIG. 6 is a side elevational view of the plate assembly shown in FIG. 5.
Figure 5:
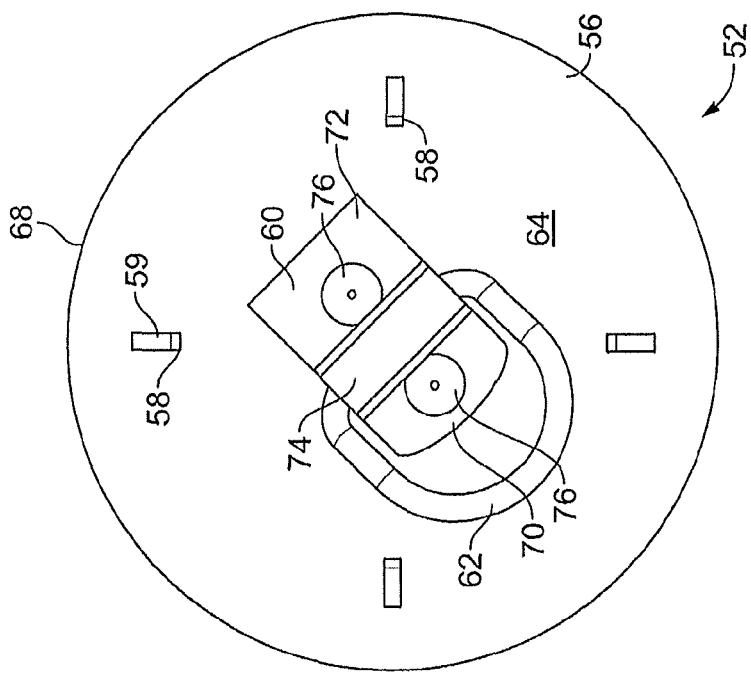
FIG. 5 is a rear elevational view of a plate assembly of the hold down assembly.

The plate assembly 52 is best shown in FIGS. 5 and 6 and includes a plate 56, locating fingers or lances 58, a mounting bracket 60 and a hold down 62. The plate assembly 52 is formed of metal. The plate 56 is galvanized. As shown, the plate 56 is generally disc-shaped, however, it is to be understood that the plate 56 can be provided in a variety of shapes, such as, for example, square, rectangular, or triangular.

The plate 56 includes an interior surface 64, an exterior surface 66 and a peripheral edge 68. The perimeter of the plate 56 is larger than the perimeter of the aperture 47 in the sidewall 24 to which the plate assembly 52 is mounted. The locating fingers 58 are equally radially spaced from a center of the plate 56. The locating fingers 58 extend perpendicularly from the interior surface 64 of the plate 56. The locating fingers 58 are formed by punching through the plate 56 to form a tab which remains attached to the plate 56 and bending the tab such that the tab is perpendicular to the remainder of the plate 56. Thus, an aperture 59 is associated with each locating finger 58. The locating fingers 58 are spaced from the center of the plate 56 such that the locating fingers 58 lie within the perimeter of the aperture 47 through the sidewall 24.

The mounting bracket 60 is provided at the center of the interior surface 64 of the plate 56. As shown, the mounting bracket 60 is generally rectangularly-shaped. The mounting bracket 60 includes first and second side portions 70, 72 and a center portion 74. The first and second side portions 70, 72 lay flat against the interior surface 64 of the plate 56. The center portion 74 extends between the two end portions 72 and is spaced away from the interior surface 64 of the plate 56 to form a tunnel. The mounting bracket 60 is preferably mounted to the plate 56 using rivets 76. The head of each rivet 76 can be positioned on the surface of the mounting bracket 60, or can be countersunk into the mounting bracket 60 such that it is flush with the mounting bracket 60, depending on the dimensions of the mounting bracket 60 and the heads of the rivets 76. The tail of each rivet 76 may extend beyond the exterior surface 66 of the plate 56, or the tail of each rivet 76 may be countersunk into the plate 56 such that it is flush with the plate 56, depending on the dimensions of the plate 56 and the tails of the rivets 76. If the tail of each rivet 76 extends beyond the exterior surface 66 of the plate 56, the distance at which each tail is proud of the plate 56 is minimized in order to minimize the exterior profile of the plate assembly 52.

As shown, the hold down 62 is formed as a D-ring with a base portion 63 and an arcuate portion 65. The base portion 63 is positioned under the center portion 74 of the mounting bracket 60 to secure the hold down 62 to the plate 56. The hold down 62 can pivot relative to the mounting bracket 60. It is also to be understood that the hold down 62 can take a variety of forms, such as a loop or a grab hook.

Figure 8A:
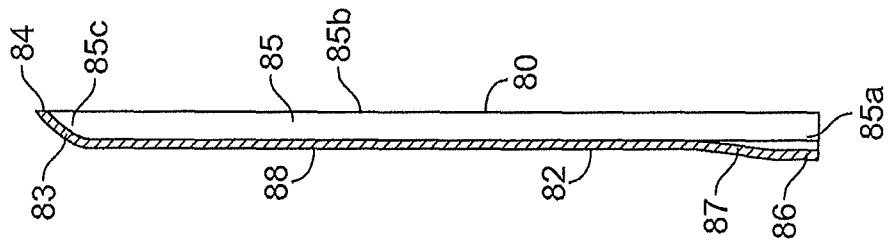
FIG. 8A is an enlarged view of a portion of the cover shown in FIG. 8.
Figure 8:
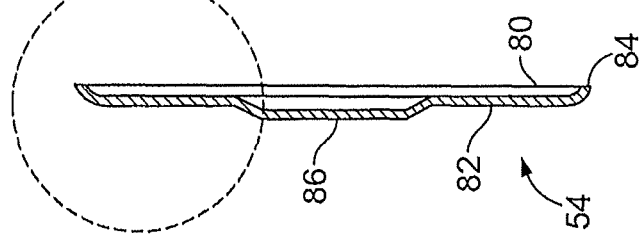
FIG. 8 is a cross sectional view along line 8-8 of the cover of FIG. 7.
Figure 7:
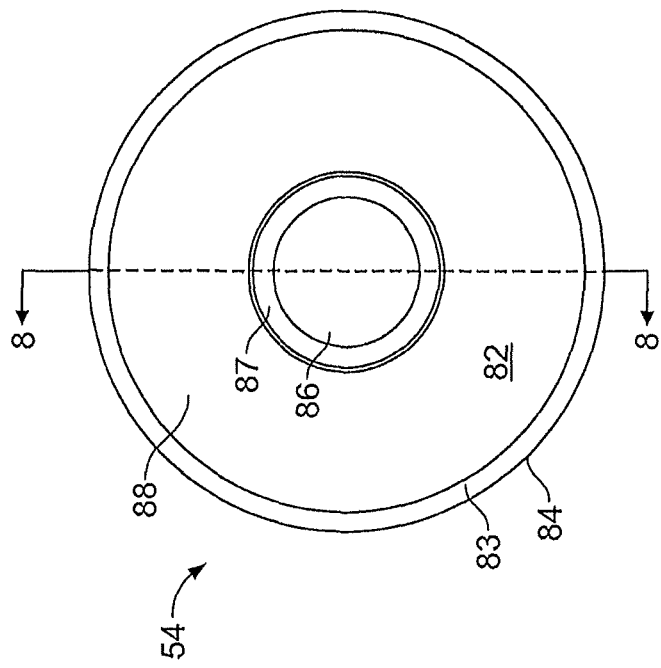
FIG. 7 is a front elevational view of a cover of the hold down assembly.

The cover 54 of the hold down assembly 50 is shown in FIGS. 7 and 8. The cover 54 includes an interior side 80, an exterior side 82, and a peripheral edge 84. The material from which the cover 54 is formed is selected to be the same material from which the outer skin 45a of the trailer sidewall 24 is formed and therefore, the color of the cover 54 is the same as the outer skin 45a of the trailer sidewall 24. The cover 54 does not have any apertures therethrough to prevent the passage of water therethrough and to provide a uniform look on the exterior surface for decals. As shown, the cover 54 includes a centrally located circular button portion 86, a circular transition portion 87 extending radially outwardly from the button portion 86, and a plate portion 88 extending radially outwardly from the button portion 86 to the peripheral edge 84. The transition portion 87 angles relative to the button portion 86 and the plate portion 88, and the button portion of the cover 54 are parallel to each other.

As best shown in FIG. 8A, an outer edge portion 83 of the cover 54 proximate to the peripheral edge 84 is curved. The interior side 80 of the cover 54 defines a cavity 85. An inner portion 85a of the cavity 85 is provided by the button portion 86, a middle portion 85b of the cavity 85 is provided by the plate portion 88, and an outer portion 85c of the cavity 85 is provided by the outer edge portion 83. As best shown in FIG. 4A, the diameter of the cover 54 is selected such that the diameter of the cover 54 at the peripheral edge 84 is larger than the diameter of the plate assembly 52 at the peripheral edge 68. In addition, the diameter of the button portion 86 of the cover 54 is sufficiently sized such that inner portion 85a of the cavity 85 accommodates the tails of the rivets 76. If the tails of the rivets 76 are countersunk into plate 56, then the button portion 86 of the cover 54 is eliminated.

The cover 54 is adhesively mounted to the exterior surface 66 of the plate assembly 52 by a bead of adhesive that is applied to the interior side 80 of the cover 54 proximate to the peripheral edge of the plate portion 88. The bead of adhesive is applied such that it is radially outward of the of the apertures 59 and inside of the outer portion 85c of the cavity 85 provided by the outer edge portion 83. The cover 54 is aligned with the plate assembly 52 such that the inner portion 85a of the cavity 85 is aligned with the tails of the rivets 76 and the middle portion 85b of the cavity 85 is aligned with the plate 56. The cover 54 is then bonded to the plate assembly 52 by the application of pressure.

Thereafter, the hold down assembly 50 is ready to be mounted to the sidewall 24. When mounted to the sidewall 24, the plate 56, the button portion 86 and the plate portion 88 are generally parallel to the exterior surface of the trailer sidewall 24. The outer edge portion 83 of the cover 54 provides a transition between the exterior surface 82 of the cover 54 and the sidewall 24 of the trailer 20, and the peripheral edge 84 of the cover 54 generally abuts against the outer surface of the panel 24. The diameter of the cover 54 is selected such that when placed over the plate assembly 52, the peripheral edge 84 of the cover 54 extends beyond and curves over the peripheral edge 68 of the plate 56.

The location and quantity of hold down assemblies 50 to be mounted to the sidewalls 24 is determined by the customers needs and desires. In addition, the position of the hold down relative to the plate assembly 52 is determined by the customers needs and desires. An aperture 47 is provided through the sidewall 24 for each hold down assembly 50 to be mounted.

Figure 9:
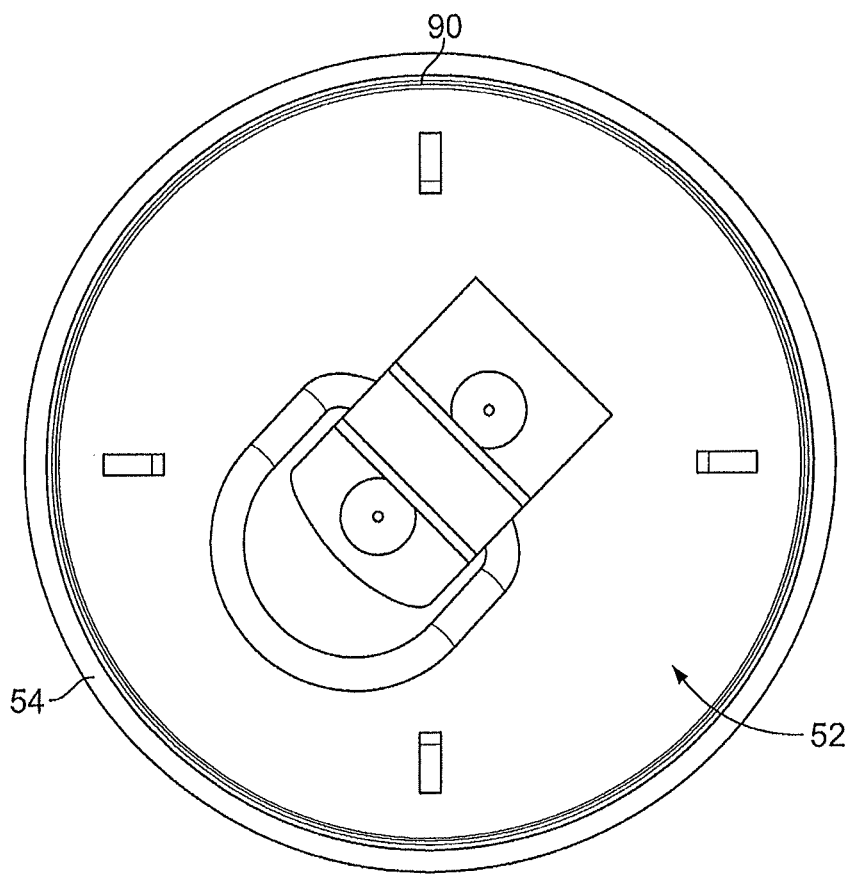
FIG. 9 is a rear elevational view of the hold down assembly with adhesive thereon and ready for mounting to a sidewall of a trailer.

As best shown in FIGS. 2 and 9, a bead of adhesive 90 is provided on the interior surface 64 of the plate 56. The adhesive 90 is spaced from the peripheral edge 68 of the plate 56 and radially outward of the mounting fingers 58 and apertures 59 of the plate 56. The plate assembly 52 is positioned over the aperture 47 of the sidewall 24 such that the locating fingers 58 extend into the aperture 47. The locating fingers 58 center the plate assembly 52 relative to the aperture 47 and the radial orientation of the plate assembly 52 can be selected as desired by the customer. Upon proper placement and orientation of the plate assembly 52, the plate assembly 52 is mounted to the exterior surface of the sidewall 24 of the trailer 20 by applying pressure to bond the adhesive 90 with the exterior surface of the sidewall 24. When adhered to the sidewall 24 of the trailer 20, the hold down 62 extends into and may extend beyond the aperture 47 in the sidewall 24 and is accessible from the interior of the trailer 20. Any adhesive 90 that is squeezed during the application of pressure may fill the well created by the outer portion 85c of the cavity 85.

Figure 10:
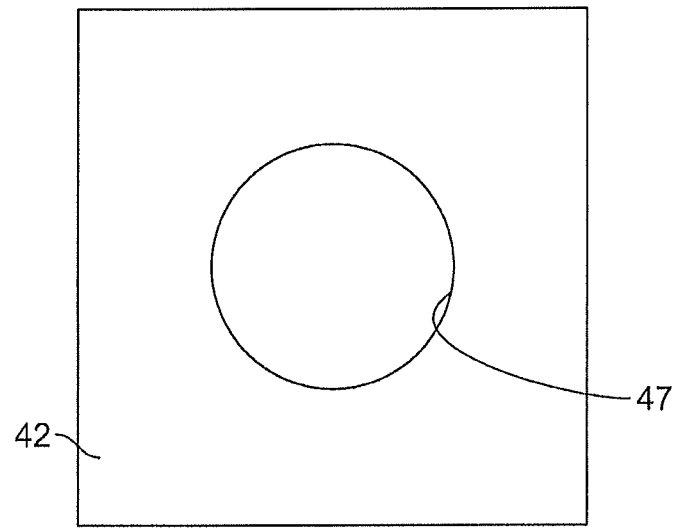
FIG. 10 is a side elevational view of a portion of a sidewall of the trailer showing a first embodiment of an aperture therethrough.
Figure 10A:
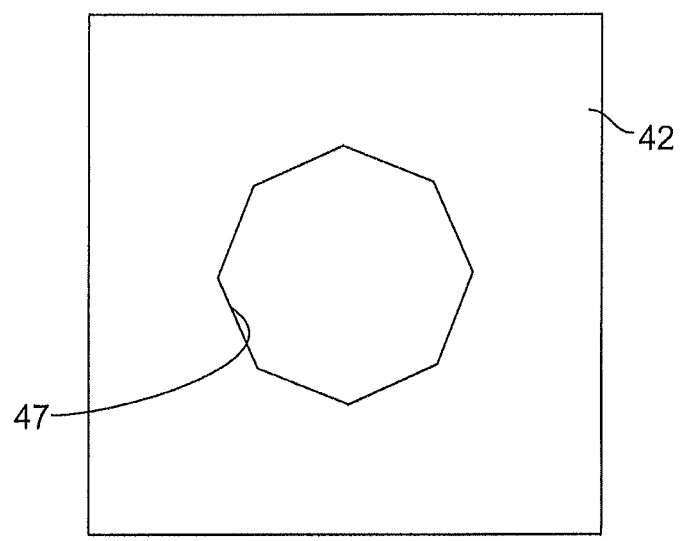
FIG. 10A is a side elevational view of a portion of a sidewall of the trailer showing a second embodiment of an aperture therethrough.

The aperture 47 can be circular as shown in FIG. 10, or the aperture 47 can be non-circular, for example, the aperture 47 is octagonal as shown in FIG. 10A. If the aperture 47 is circular, after the locating fingers 58 are inserted therein, the plate assembly 52 is rotated to a desired position. If the aperture 47 is non-circular, the locating fingers 58 are inserted therein such that the hold down 62 is in the desired orientation, and each locating finger 58 contacts one of the flats which form the surfaces of the non-circular aperture 47. If the aperture 47 is non-circular, the hold down assembly 50 cannot be rotated within the aperture 47 since the locating finger 58 contacts the flat. This non-circular aperture 47 allows for a greater uniformity in orientation to be more easily achieved when mounting multiple hold down assemblies 50.

As best shown in FIGS. 4 and 8, the hold down assembly 50 extends minimally from the exterior surface of the sidewall 24 and thus, provides a low profile which is lower in profile than the prior art. This low profile improves the aesthetics of the exterior surface of the trailer sidewall 24. Importantly, given the extremely low exterior profile of the hold down assembly 50, decals and painted logos, for example, can be applied to the exterior surface of the sidewall 24 without substantial obstruction or substantial deformation of the decal or logo. In addition, because the sidewall 24 and the cover 54 are formed from the same material, the sidewall 24 and the cover 54 provide the same characteristics with respect to the paint used to cover the sidewall 24 and/or the logo applied to the sidewall 24. Therefore, no differentiation with respect to absorption or color, for example, will be observed between the cover 54 and the sidewall 24. The bonding of the cover 54 to the plate assembly 52 and the plate assembly 52 to the sidewall 24 prevents water from flowing through the apertures 59 of the plate 56 and into the interior of the trailer 20.

In use, outside members, such as straps 26, are attached by known means to the hold downs 62 to secure cargo 27 within the trailer 20.

The hold down assembly 50 can be used to replace prior art hold down assemblies used in the prior art by removing the prior art hold down assembly from the trailer and replacing it with the hold down assembly 50. As a result, older trailers can be retrofitted with the low-profile hold down assemblies 50.

The hold down 62 is shown and described as being statically mounted to the plate 56 using a mounting bracket 60 and rivets 76. Alternatively, the hold down 62 could be rotationally mounted to the plate 56 using a pin (not shown) which rotates relative to the plate 56.

It is to be understood that, if desired, the cover 54 can be directly mounted to the sidewall 24 as opposed to the plate assembly 52 by providing the bead of adhesive to the inner surface of the outer edge portion 83 of the cover 54. It is also to be understood that the plate assembly 52 can be mounted to the sidewall 24 using tape and the cover 54 can be mounted to the plate assembly 52 using tape.

The cover 54 is sized to accommodate the plate assembly 52. More specifically, the button portion 86 of the cover 54 is provided to accommodate the tails of the rivets used to mount the hold down 62 to the plate 56 if the tails of the rivets are proud of the plate 56. Alternatively, the hold down 62 could be adhesively mounted to the plate 56 or the hold down 62 could be mounted to the plate 56 by welding; in either case, the button portion 86 of the cover 54 would not be necessary and the cover 54 would provide an even lower exterior profile.

While preferred embodiments of the present invention are shown and described, it is envisioned that those skilled in the art may devise various modifications of the present invention without departing from the spirit and scope of the appended claims.

What is claimed is:

1. A hold down assembly for attachment to a sidewall of a trailer, comprising:
    a plate assembly including (i) a one-piece plate having an interior surface, an exterior surface and a peripheral edge, and (ii) a hold down mounted to the interior surface of the plate, wherein the hold down is capable of having cargo within the trailer secured thereto; and
    a cover having an interior surface, an exterior surface, and a peripheral edge, wherein the cover is positioned over and engaged with the exterior surface of the plate assembly,
    wherein the plate includes a locating finger provided thereon which extends generally perpendicular to the plate, wherein the locating finger is (i) spaced-apart art from the hold down and the peripheral edge of the plate, and (ii) configured to be received through an aperture of the sidewall of the trailer to engage a portion of the sidewall of the trailer defining the aperture, and wherein a portion of the plate positioned radially outward from the locating finger is configured to engage an exterior surface of the sidewall.

2. A hold down assembly for attachment to a sidewall of a trailer, comprising:
    a plate assembly including (i) a plate having an interior surface, an exterior surface and a peripheral edge, and (ii) a hold down mounted to the interior surface of the plate, wherein the hold down is capable of having cargo within the trailer secured thereto; and
    a cover having an interior surface, an exterior surface, and a peripheral edge, wherein the cover is positioned over the exterior surface of the plate assembly,
    wherein the plate includes a locating finger provided thereon which extends generally perpendicular to the plate,
    wherein the locating finger is spaced-apart from the peripheral edge of the plate, and
    further comprising adhesive provided on the interior surface of the plate between the locating finger and the peripheral edge of the plate, and wherein the adhesive is configured to rigidly couple the plate to the sidewall of the trailer.

3. The hold down assembly of claim 1, wherein the plate includes an aperture associated with and adjacent to the locating finger.

4. The hold down assembly of claim 3, wherein the plate aperture is located radially outwardly from the locating finger.

5. The hold down assembly of claim 1, wherein the plate further includes a second locating finger spaced-apart from the first locating finger, wherein the second locating finger extends generally perpendicular to the plate and is spaced-apart from the peripheral edge of the plate, and further wherein the first and second locating fingers are configured to be received through an aperture formed in a sidewall of the trailer.

6. The hold down assembly of claim 5, wherein the first and second locating fingers are equally radially spaced from a center of the plate.

7. The hold down assembly of claim 1, wherein the cover is fixedly mounted to the plate to prevent relative movement therebetween.

8. The hold down assembly of claim 1, wherein the hold down is a D-ring.

9. The hold down assembly of claim 1, wherein the hold down is fixedly attached to the plate by a mounting bracket.

10. The hold down assembly as of claim 1, wherein the peripheral edge of the cover is curved inwardly and is configured to engage an exterior vertical surface of the sidewall of the trailer.

11. The hold down assembly of claim 1, wherein the cover is devoid of apertures.

12. The hold down assembly of claim 1, wherein the peripheral edge of the cover is configured to extend beyond the peripheral edge of the plate assembly.

* * * * *